(12) United States Patent
Peuhkurinen et al.

(10) Patent No.: US 10,635,571 B2
(45) Date of Patent: Apr. 28, 2020

(54) APPARATUS WITH TEST EXECUTION ENVIRONMENT

(71) Applicant: Huawei Technologies Co., Ltd., Shenzhen (CN)

(72) Inventors: Antti Erik Peuhkurinen, Helsinki (FI); Panu Johansson, Helsinki (FI); Janne Hirvimies, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 15/570,641

(22) PCT Filed: Apr. 30, 2015

(86) PCT No.: PCT/EP2015/059604
§ 371 (c)(1),
(2) Date: Oct. 30, 2017

(87) PCT Pub. No.: WO2016/173677
PCT Pub. Date: Nov. 3, 2016

(65) Prior Publication Data
US 2018/0285243 A1  Oct. 4, 2018

(51) Int. Cl.
*G06F 11/36* (2006.01)
*G06F 21/53* (2013.01)
*G06F 21/56* (2013.01)

(52) U.S. Cl.
CPC ...... *G06F 11/3664* (2013.01); *G06F 11/3688* (2013.01); *G06F 21/53* (2013.01);
(Continued)

(58) Field of Classification Search
CPC ............ G06F 11/3664; G06F 11/3688; G06F 11/3672; G06F 11/3692; G06F 21/53; G06F 21/566
See application file for complete search history.

(56) References Cited

U.S. PATENT DOCUMENTS 6,418,391 B1 * 7/2002 Umezu ............ G01R 19/2516
702/119
8,406,734 B2 * 3/2013 Otaka .................... H04L 67/34
455/410

(Continued)

OTHER PUBLICATIONS

Schreuders, C., et al., "The State of the Art of Application Restrictions and Sandboxes: A Survey of Application-oriented Access Controls and their Shortfalls," XP055101025, Computers and Security, Sep. 29, 2012, 40 pages.

(Continued)

*Primary Examiner* — Nadeem Iqbal
(74) *Attorney, Agent, or Firm* — Conley Rose, P.C.

(57) ABSTRACT

An apparatus with a standard zone and a test zone, where the standard zone includes a standard execution environment providing access to genuine resources of the apparatus and the test zone includes a test execution environment providing access to mock resources, with a mock resource modeling a genuine resource of the apparatus. The application has access to the genuine resources when the application is executed in the standard zone. The application has access to the mock resources when the application is executed in the test zone and the application does not have access to the genuine resources when the application is executed in the test zone.

20 Claims, 4 Drawing Sheets

(52) U.S. Cl.
CPC ...... *G06F 21/566* (2013.01); *G06F 2221/033* (2013.01); *G06F 2221/2101* (2013.01)

(56) References Cited

U.S. PATENT DOCUMENTS

| | | | | |
|---|---|---|---|---|
| 8,615,737 B2* | 12/2013 | Walsh | ............... | G06F 21/53 717/120 |
| 10,114,973 B2* | 10/2018 | Mizhen | ............... | G06F 21/6245 |
| 2002/0188649 A1* | 12/2002 | Karim | ............... | G06F 21/53 718/104 |
| 2013/0086684 A1* | 4/2013 | Mohler | ............... | G06F 21/53 726/24 |
| 2014/0068326 A1* | 3/2014 | Quinn | ............... | G06F 11/0709 714/15 |
| 2015/0339492 A1* | 11/2015 | Mizhen | ............... | G06F 21/6245 726/26 |
| 2016/0259939 A1* | 9/2016 | Bobritsky | ............... | G06F 21/566 |

OTHER PUBLICATIONS

Foreign Communication From a Counterpart Application, PCT Application No. PCT/EP2015/059604, International Search Report dated Jan. 19, 2016, 5 pages.

Foreign Communication From a Counterpart Application, PCT Application No. PCT/EP2015/059604, Written Opinion dated Jan. 19, 2016, 6 pages.

"How to manage iPhone privacy settings," Retrieved from website: https://jingyan.baidu.com/article/851fbc37f499793e1f15aba4.html, Aug. 12, 2013, 7 pages.

English Translation of "How to manage iPhone privacy settings," Retrieved from website: https://jingyan.baidu.com/article/851fbc37f499793e1f15aba4.html, Aug. 12, 2013, 3 pages.

Foreign Communication From a Counterpart Application, Chinese Application No. 201580079609.5, Chinese Office Action dated Dec. 2, 2019, 7 pages.

* cited by examiner

ABSTRACT WITH TEST EXECUTION
ENVIRONMENT

CROSS-REFERENCE TO RELATED APPLICATION

This application is a U.S. National Stage of International Patent Application No. PCT/EP2015/059604 filed on Apr. 30, 2015, which is hereby incorporated by reference in its entirety.

TECHNICAL FIELD

The present disclosure relates generally to execution environment access rights on computing devices and in particular, to an apparatus that allows a new application to be installed thereon in an execution environment.

BACKGROUND

As the mobile operating system (such as ANDROID) device base is growing there will be growing number of malicious application and spyware. Furthermore, applications in general are collecting vast amount of user data and users have very little means to affect or control this development. In everyday life, consumers are paying more attention to their privacy while sharing using their personal devices and services through mobile devices. Local legislation cannot provide enough ways to control and to protect in a way that is needed in global environment. An end user has to have additional means for privacy protection in accordance with his/her decisions and needs.

Service providers are using "privacy disclaimers" as their "get out of jail free cards" to gain authority to use personal information like location, contacts, age, gender, and other services used, etc. on. In practice, an end user has no choice but to accept the conditions and the associated loss of privacy.

Consequently, with the presently available technology a newly installed application can freely roam the personal information that is stored on an apparatus without the owner (user) of the apparatus knowing what is going on.

Thus, there is a need for an apparatus that overcomes or at least reduces the above problem.

SUMMARY

It is an object of the disclosure to provide an apparatus that overcomes or at least reduces the above problem.

The foregoing and other objects are achieved by the features of the independent claims. Further implementation forms are apparent from the dependent claims, the description and the figures.

According to a first aspect an apparatus for executing an application is provided, the apparatus being configured to provide a standard zone and to provide a test zone, the standard zone including a standard execution environment providing access to genuine resources of the apparatus, the test zone including a test execution environment providing access to mock resources, a mock resource (e.g. each of the mock resources) modeling a genuine resource of the apparatus, where the application has access to the genuine resources when the application is executed in the standard zone, the application has access to the mock resources when the application is executed in the test zone and the application does not have access (or is forbidden access) to the genuine resources when the application is executed in the test zone.

By providing a test zone that gives the application access to mock resources instead of genuine resources it becomes possible to test which resources the application attempts to access without the application getting access to genuine information. Furthermore, a user can test the application without causing any risk.

According to a first implementation of the first aspect each of the mock resources imitates a genuine resource of the apparatus. Thus, from the perspective of the application, the mock resources appear to be genuine resources. Hence, the user can test all functions of the application.

According to a second implementation of the first aspect the apparatus is a mobile communication device.

According to a third implementation of the first aspect the apparatus is configured to download the application from an application server.

According to a fourth implementation of the first aspect the apparatus is configured to store the application in an executable (by an operation system of the apparatus) version. As an example, the application may be in a complied from. Thus, the applications can be directly executed by the operating system without further compiling. As an example, the application can be downloaded by the apparatus from above mentioned application server in an executable (e.g. already compiled) version.

According to a fifth implementation of the first aspect the test zone is an isolated execution environment that allows testing of access to resources by the application in the test zone. Thus, the application can be isolated from the system services when it is in the test zone. This ensures that the application will not access information that is not supposed to have access to.

According to a sixth implementation of the first aspect the apparatus is configured to monitor which mock resources are accessed by the application in the test zone. Thus, an overview is created of the information collecting activities of the application.

According to a seventh implementation of the first aspect the apparatus has a display screen and is configured to visualize which of the mock resources the application in the test zone has accessed.

According to an eighth implementation of the first aspect the apparatus is configured to allow a user to move the application from the test zone to the standard zone and provide the application access to genuine resources in the standard zone. The above moving of the application should be understood as stopping to execute the application in the test zone and starting to execute the application in the standard zone. Thus, a mechanism is provided to select in which zone the application is installed and/or executed. Thus, easy and intuitive user experience without a need to perform extensive system configuration is provided.

According to a ninth implementation of the first aspect the apparatus is configured to present to a user which mock resources have been accessed by the application in the test zone. Thus, the user is clearly informed about the activities of an application in the test zone.

According to a tenth implementation of the first aspect the apparatus is configured to automatically present to a user which mock resources have been accessed by the application in the test zone when an application is moved from the test zone to the standard zone. Thus, the user is automatically reminded about any possible risks associated with the move of an application from the test zone to the standard zone.

According to an eleventh implementation of the first aspect the apparatus being configured to provide a user with a choice which genuine resources corresponding to accessed mock resources the application will be allowed to access by the application when the application is executed in the standard zone. Thus, the possibility is provided to selectively allow an application access to different types of genuine private information.

According to a twelfth implementation of the first aspect the apparatus is configured to request the user to decide whether an application should be installed in the test zone or in the standard zone. Thus, a mechanism is provided to avoid that an application is automatically installed in the standard zone, and a mechanism is provided to remind the user of making a choice between the standard zone and the test zone for installing a new application.

According to a thirteenth implementation of the first aspect the mock resources comprise a mock user data backend, and the genuine resources preferably comprise a genuine user data backend. Providing mock resources creates a possibility testing an application as to its activities in accessing user data, without the application having access to genuine user data.

According to a fourteenth implementation of the first aspect the mock user data backend contains correctly formatted but fake user data, and the genuine user data backend preferably contains correctly formatted and genuine user data. By providing correctly formatted data in the test zone, it will render it more difficult to create an application that can detect that it is placed in a test environment and thereby act differently than when placed in a standard environment. Therefore, applications cannot identify if they are currently executed in the standard zone or the test zone.

According to a fifteenth implementation of the first aspect the test zone isolates the application from the operating system of the apparatus and from other applications on the apparatus. Thus, a mechanism for preventing a newly installed application in the test zone from accessing real data and other applications on the apparatus is provided.

According to a sixteenth implementation of the first aspect the apparatus is configured to isolate the test zone. Thus, an application in the test zone is prevented from accessing resources outside the test zone.

According to a seventeenth implementation of the first aspect the apparatus is configured to launch application bundles.

According to an eighteenth implementation of the first aspect the test zone is rendered secure by means of a certification system.

According to a nineteenth implementation of the first aspect the apparatus is configured load and verify an application certificate associated with an application before execution of the application, the apparatus preferably being configured to prevent execution of the application if the certificate cannot be verified.

According to a twentieth implementation of the first aspect the apparatus is configured load and verify an application manifest associated with an application.

According to a twenty first implementation of the first aspect the apparatus further includes a display screen and a graphical User Interface.

According to a twenty second implementation of the first aspect the genuine resources may comprise contacts, text messages, E-mail(s), Photos, Media, Files, Camera data, Microphone recordings, BLUETOOTH Connection information, Device identifier (ID), Location, Call information and/or Calendar information.

According to a twenty third implementation of the first aspect the genuine resources are divided into a plurality of types of personal information.

According to a twenty fourth implementation of the first aspect the types of information may comprise contacts, text messages, E-mail(s), Photos, Media, Files, Camera data, Microphone recordings, BLUETOOTH Connection information, Device ID, Location, Call information and/or Calendar information.

The object above is also achieved in accordance with a second aspect.

According to the second aspect a method for testing an application on an apparatus, such as a computing device for executing an application or node that models a computing device for executing an application is provided, the method includes executing an application in a test zone that does not allow access to genuine resources on the apparatus, and allowing the application access to mock resources in the test zone, a mock resource, (e.g. each of the mock resources) modeling a genuine resource of the apparatus.

According to a first implementation of the second aspect the method further includes preventing an application executed in the test zone from accessing genuine resources on the apparatus.

According to a second implementation of the second aspect the method further includes monitoring which mock resources are accessed by the application when executed in the test zone.

According to a third implementation of the second aspect the method further includes presenting to a user a list of mock resources that have been accessed by the application when executed in the test zone.

These and other aspects will be apparent from the example embodiment(s) described below.

BRIEF DESCRIPTION OF THE DRAWINGS

In the following detailed portion of the present disclosure, the disclosure will be explained in more detail with reference to the example embodiments shown in the drawings.

DETAILED DESCRIPTION

Figure 1:
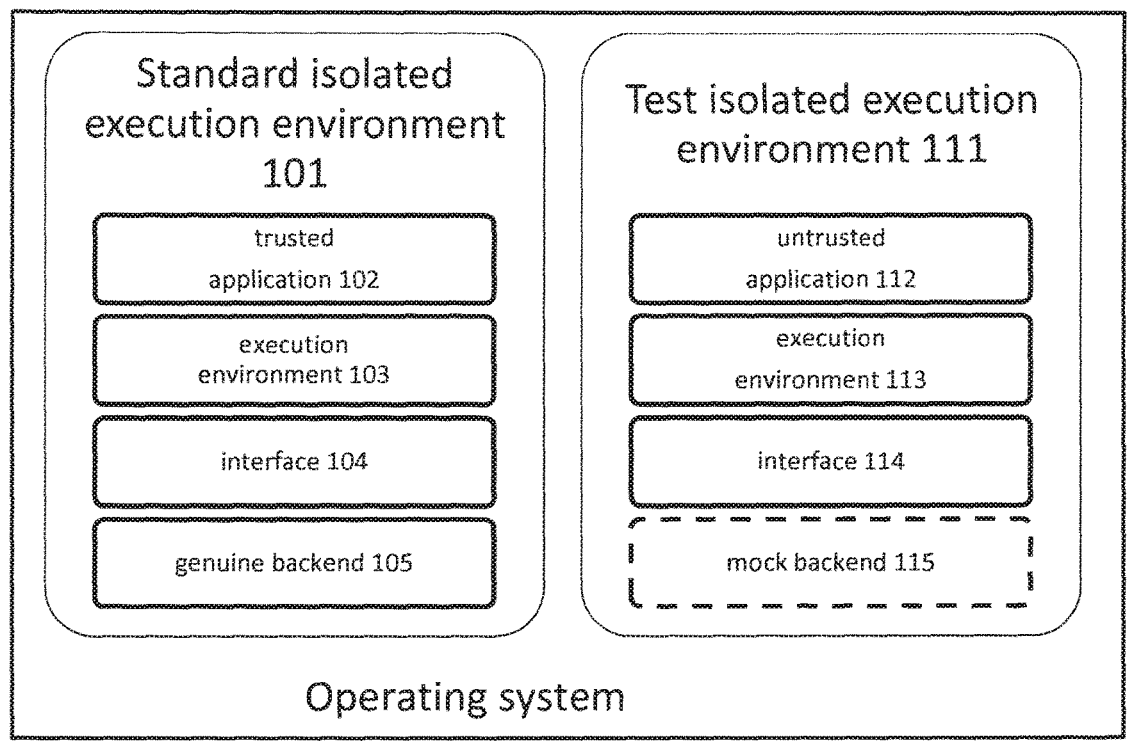
FIG. 1 is a diagram representing two execution zones according to an example embodiment in an operating system.

FIG. 1 shows two layered stacks in an operating system of an apparatus and illustrates the difference between the two stacks. Shown on the left is a standard isolated execution environment 101 (i.e., a standard zone) where trusted application 102 is executed. Shown on the right is a test isolated execution environment 111 (i.e., a test zone), where untrusted application 112 is executed for testing which resources and/or applications in the test isolated execution environment 111, the untrusted application 112 attempts to access or actually accesses.

From an application aspect both of the stacks 101, 111 look similar and preferably indistinguishable. Both stacks 101, 111 in their own isolated environment have similar execution environments 103,113 and interfaces 104,114.

The isolation from the operating system (real system services) is in an example embodiment implemented by process isolation using LINUX namespaces. Inside the standard zone 101, process isolation (by the operating system) is sufficient, i.e. the test zone 111 isolation implementation would be a container (using namespaces).

The difference between stacks is that in the test zone 111 the application accesses mock data in the form of a mock backend 115 that contain fake or dummy data instead of the genuine backend 105 that contain genuine user data. The mock backend 115 contains a data backend with fake or dummy data and hardware interfaces that only have a dummy or stub implementation to protect user data and other application data in order to provide security to the system. Each of the mock resources models a genuine resource of the apparatus. From an application point of view, the mock resources and the genuine resources are indistinguishable.

A non-exhaustive list of backend mock data includes the data types of Contacts, short message service (SMS) and multimedia message service (MMS), E-mail, Photos/Media/Files, Camera, Microphone, BLUETOOTH Connection information, Device ID, Location, Call information and/or Calendar.

The mock data imitates or models a genuine resource with correct formatting for the type of personal data concerned, but the content of the correctly formatted personal data is false, i.e. fabricated or fake.

The untrusted application 112 is in an example embodiment downloaded on the apparatus from an application server in an executable, for example, (pre)compiled version, i.e. so that the untrusted application 112 can be executed by the operating system of the apparatus without further compiling.

Figure 2:
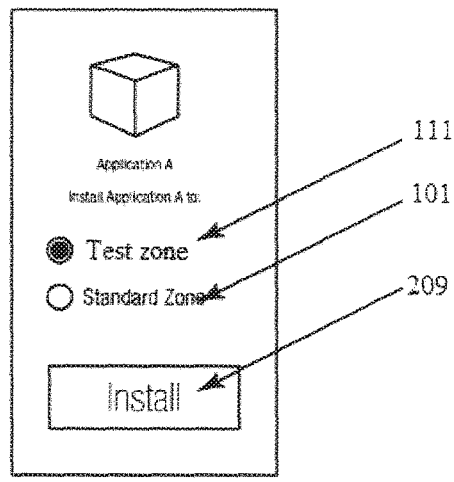
FIG. 2 is a screenshot illustrating a process during installation of an application.

FIG. 2 is a screenshot illustrating the process when a user installs a new application (designated as Application A) to the device. A zone management system prompts the user to choose in which of the zones, the Application A shall be installed. The choices are in this example embodiment between a Standard zone 101 and a Test zone 111. The user chooses the relevant zone for the installation and confirms the installation by pressing the Install button 209. The number of zones in the operating system is depended on the use and functionality of the device and can be anything from two and upwards.

Figure 3:
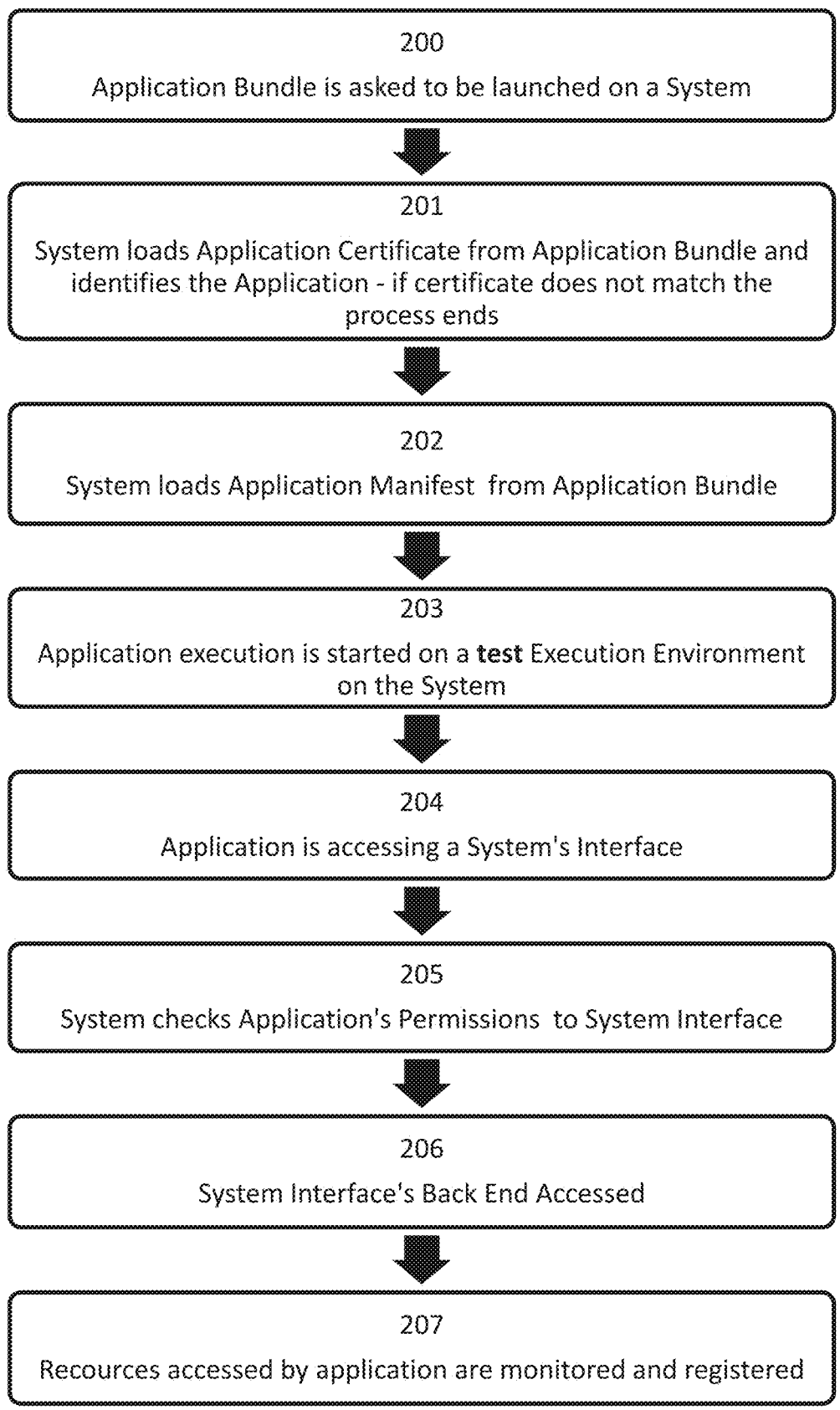
FIG. 3 is a flowchart illustrating a method according to an example embodiment illustrating a process of installing and running an application in a zone.

FIG. 3 illustrates an embodiment of a backend accessing process in a computing device. The process is exactly the same for trusted applications in a standard zone and for untrusted applications in a test zone. The difference between the two processes is that the untrusted application in the test zone accesses mock backend that contain dummy user data, whilst the trusted application uses or has access to genuine backend that contain genuine user data.

FIG. 3 describes the process when an untrusted application accesses mock backend in the test zone. First, an Application Bundle is asked to be launched on a System in step 200. The execution environment is to be understood as a system such as a computing device hardware or another node that models the computing device hardware by other means for example with software. Next the system loads the application certificate from application bundle and identifies the application-if certificate does not match, the process ends in step 201. The application certificate is in the context of this disclosure considered to be any information that can validate the author of the application, i.e. the exact data that should be in the application bundle. If certificate signing matches the application bundle data, the system accepts that the package is intact. If package data does not match to the certificate the system knows that package has been changed and thus considers the package to be corrupted and it is not run on the system. After verifying that the package is intact the system loads the Application Manifest from application bundle in step 202.

The manifest contains the permissions that application needs to access. The application execution is started on a test execution environment on the system in step 203. While running, the application is accessing a system's interface in step 204. For this, the system checks the application's permissions to system interface in step 205. For testing the untrusted application in the test zone all permissions are enabled thus enabling the untrusted application to use all of the mock backend freely. Because the system interface can be successfully accessed by the application a mock system interface backend is accessed by the application in step 206. The system monitors the resources accessed by the application and registers these activities in a log in step 207.

Figure 4:
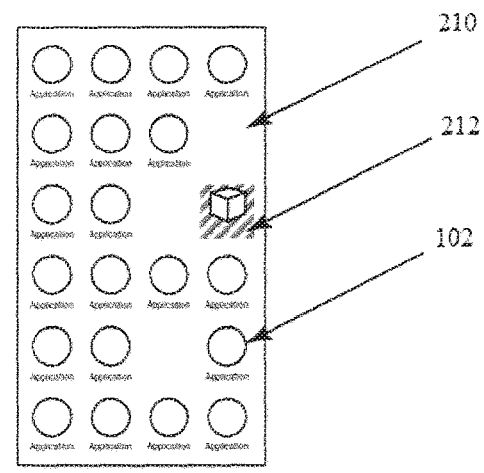
FIG. 4 is a screenshot showing a plurality of applications installed on an apparatus including one application that is installed in a test zone.

A test zone, such as the test zone 111 provides users with a safe environment where they can try out a new (untrusted) application 112. The Container formed by the test zone 111 ensures that no genuine system resources are used without authorization of the user. As shown in the screenshot of FIG. 4, with respect to FIG. 1, the application 112 is displayed on application grid 210 in the same way as all the other applications 102 with addition of a graphical indication 212 about the applications placement in a Test Zone (container) 111.

Figure 5:
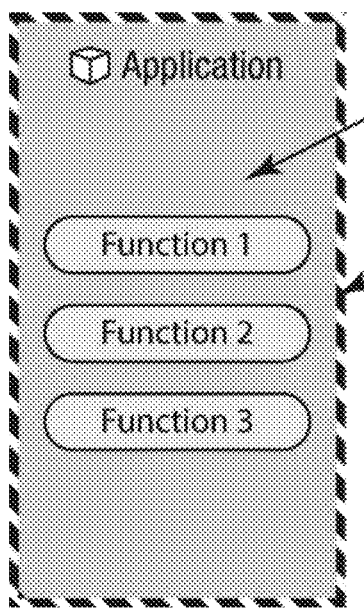
FIG. 5 is a screenshot of an application running in the test zone.

With respect to FIG. 1, FIG. 5 shows a screenshot 213 of an application 112 running in the test zone 111 with example functionalities, Function 1, Function 2, and Function 3. However, it will be understood that these functionalities are merely illustrative and do not represent functionalities of the concerned application 112. The functionalities will vary and depend on the application 112 concerned, and are not necessarily displayed as virtual buttons on a display screen.

As shown in the screenshot of FIG. 5, a border 214 is provided around the application 112 to indicate to a user that the application 112 is running in the test zone 111. The application 112 is given access to dummy or fake resource (from a mock backend) such as user name, address, phone number, location (a fixed coordinates) etc.

Figure 6:
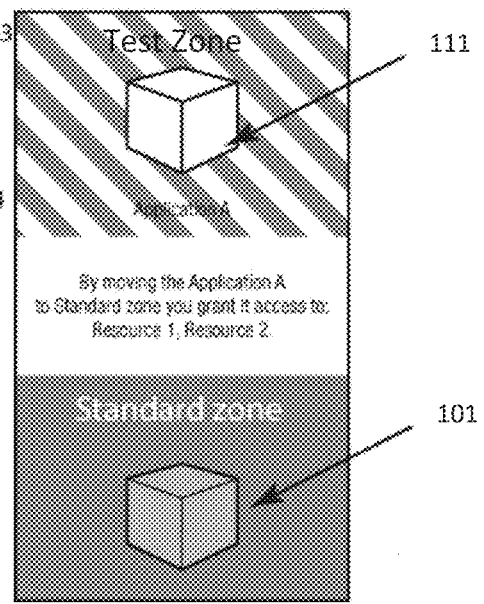
FIG. 6 is a screenshot showing a dialogue for moving application from the test zone to a standard zone.

The application 112 can be used in the test zone 111 to see how it functions. Once a user decides that he/she would like the full functionality, the application 112 can be moved to the standard zone 101 using a graphical user interface. In this process, as shown in FIG. 6, there is automatically displayed a listing or log of which resources have been accessed in the mock backend 115 by the concerned application 112 when executed in the test zone 111.

Figure 7:
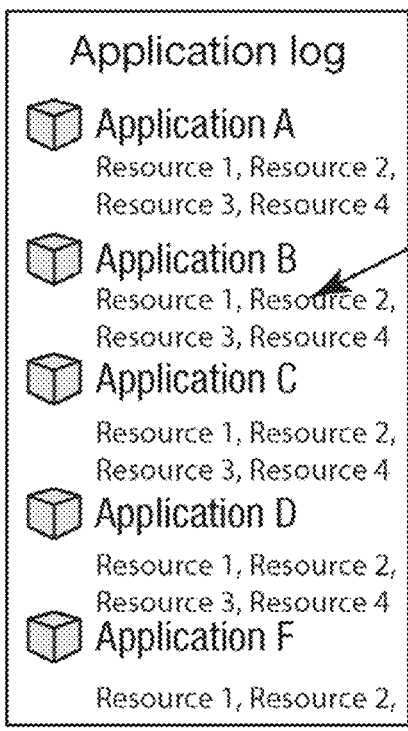
FIG. 7 is a screenshot showing an activity log.

FIG. 7 shows the log dialogue 217 that is displayed when a user moves (or wants to move) an application from the test zone 111 to the standard zone 101. The user will be asked to grant the needed access rights when an application (designated as Application A, Application B, Application C, Application D, and Application F in FIG. 7) is migrated from test zone 111 to standard zone 101. All the resource needed (designated as Resource 1, Resource 2, Resource 3, and Resource 4 in FIG. 7) by the application are shown in the log dialogue 217 for the user for reference and selection of the resources that the user decides to allow the application to access when executed in the standard zone 101.

The software developer can define the services used by the application 112 with simple development tools enabled by the methods discussed in this disclosure. And those and only those are then available in the container in which the application is installed. For example a banking application has no need to access the user contact data, so this resource is not made available for the application. This ensures that the application cannot be used to exploit any resources which are outside of the scope of that container.

Figure 8:
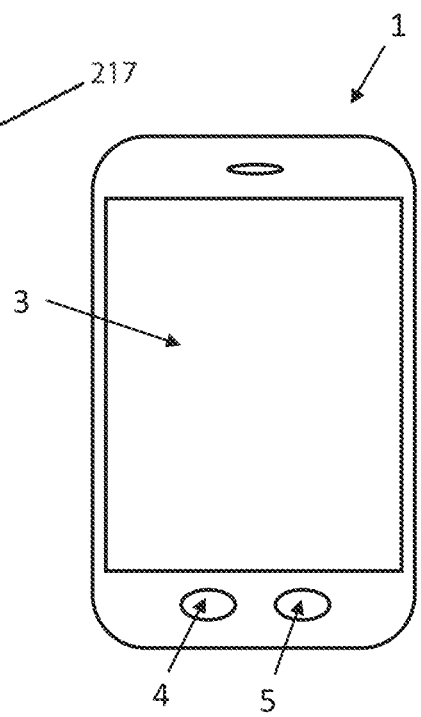
FIG. 8 is a front view of an apparatus in accordance with an example embodiment.

FIG. 8 shows an apparatus 1 that is capable of running an application. The apparatus 1 can be computing device hardware or a node that models a computing device hardware by other means for example with software.

In this example embodiment the apparatus 1 is a mobile phone. However, it is understood that the apparatus 1 could just a well be any other device that can run an application, such as a tablet computer, a laptop computer or a desktop computer. The apparatus 1 has a housing, a display 3, and several buttons 4 and 5. The apparatus 1 is in an embodiment adapted for communication via a cellular network, such as the fourth generation (4G) network, but could just as well be adapted for use with a different wireless network, or a transmission control protocol (TCP)/Internet protocol-based (IP-based) network to cover a possible voice over IP-networking (VoIP-network) (e.g. via wireless local area network (WLAN), Worldwide Interoperability for Microwave Access (WIMAX) or similar).

The apparatus 1 is provided with a display 3 that may be realized using a Liquid Crystal Display or Active Matric Organic Light Emitting Diodes. The display 3 may be combined with a touch panel to form a single module. The apparatus 1 is in an embodiment provided with several buttons 4 and 5 for user input. Instead or in addition to a touch screen the apparatus 1 may be provided with or be connected to a keypad or keyboard.

A battery pack in the apparatus 1 supplies electrical power for the electronic components of the apparatus 1. A terminal for charging the battery pack is also provided. In another embodiment the apparatus is powered by the mains and is not provided with a battery.

Figure 9:
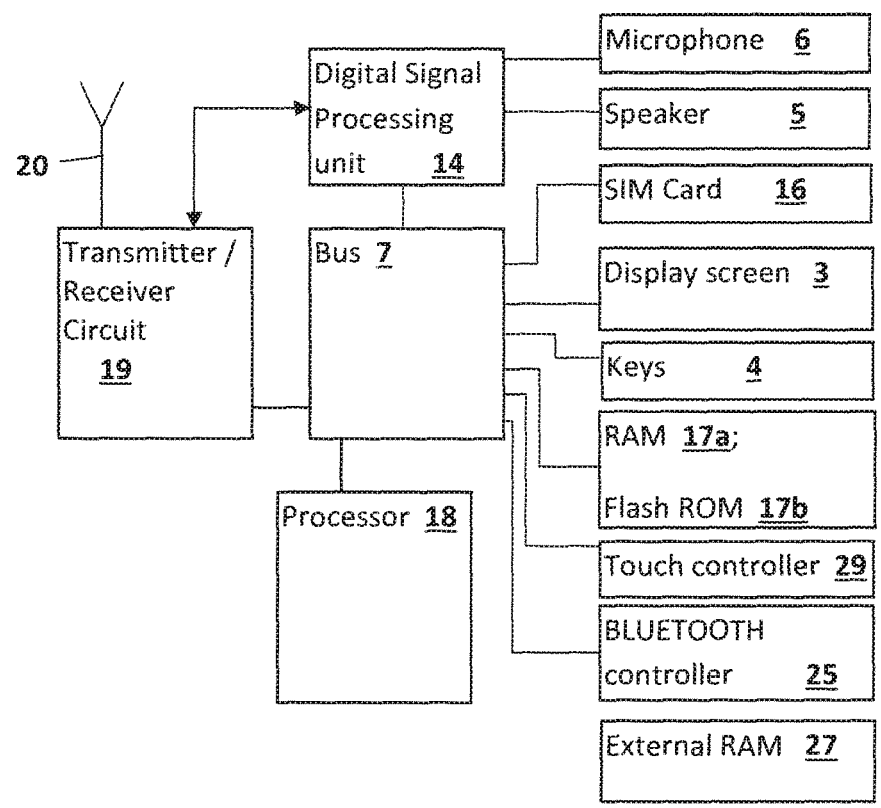
FIG. 9 is a block diagram illustrating the general architecture of the apparatus of FIG. 8.

FIG. 9 illustrates in block diagram form the general architecture of the apparatus 1. A processor 18 controls the communication with the cellular network via a transmitter/receiver circuit 19 and an antenna 20. A microphone 6 transforms sound into analogue signals, the analogue signals formed thereby are analog to digital (A/D) converted in an A/D converter (not shown) before the speech is encoded in a digital signal processing unit 14. The encoded speech signal is transferred to the processor 18, which supports the 4G terminal software. A bus 7 forms the interface to the processor 18 and the peripheral units of the apparatus, including a random access memory (RAM) 17a and a Flash read-only memory (ROM) 17b, a subscriber identity module (SIM) card 16, the display screen 3, a BLUETOOTH controller 25, communication port (not shown) and touch controller 29, external RAM 27 and keys 4 (as well as data, power supply, etc.). The digital signal processing unit 14 decodes the signal, which is transferred from the processor 18 to the speaker 5 via a digital to analog (D/A) converter (not shown).

An advantage of embodiments of the disclosure is the possibility to have a system that can be used in a safe manner without compromising user privacy, device integrity and confidentiality of device and user data. From a user perspective the mechanism is easy and does not require extensive system configuration skills.

It is another advantage of the embodiments of the disclosure is that an isolation mechanism for a user to use and test an untrusted or new application.

It is yet another advantage of the embodiments of the disclosure is that an isolation mechanism for a user to use and test an untrusted or new application without compromising user data privacy, device integrity and data confidentiality.

It is yet another advantage of the embodiments of the disclosure is that a mock data backend for use in a test zone is provided such that real or genuine user data will not be exposed to untrusted applications. Untrusted applications only gain access to default fake values (i.e. default names in a fake address book, default locations, etc).

It is yet another advantage of embodiments of the disclosure is that a mechanism is provided to transfer an application between a test zone and a standard zone.

The disclosure has been described in conjunction with various embodiments herein. However, other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:

1. An apparatus for executing an application, comprising:
a memory comprising instructions; and
a processor coupled to the memory, wherein the instructions cause the processor to be configured to:
receive a user selection of whether to execute the application in a standard zone or a test zone;
provide the standard zone comprising a standard execution environment configured to provide access to genuine resources of the apparatus to execute the application in response to the user selection indicating the standard zone, wherein the application has access to the genuine resources when the application is executed in the standard zone;
provide the test zone comprising a test execution environment configured to provide access to mock resources of the apparatus to execute the application in response to the user selection indicating the test zone, wherein the mock resources model a genuine resource of the apparatus, wherein the application has access to the mock resources when the application is executed in the test zone, and wherein the application does not have access to the genuine resources when the application is executed in the test zone;

display the application and other applications as application icons on an application icon grid of a user interface of the apparatus, wherein at least one of the application icons is displayed with a first graphical indicator indicating that the application corresponding to the at least one of the application icons is executed in the test zone;

launch the application associated with the at least one of the application icons in the test zone; and display the application launched in the test zone along with a second graphical indicator indicating that the application is executed in the test zone.

2. The apparatus of claim 1, wherein each of the mock resources imitates the genuine resource of the apparatus.

3. The apparatus of claim 1, wherein the apparatus comprises a mobile communication device.

4. The apparatus of claim 1, wherein the instructions further cause the processor to be configured to download the application from an application server.

5. The apparatus of claim 1, wherein the instructions further cause the processor to be configured to store the application in an executable version.

6. The apparatus of claim 1, wherein the test zone comprises an isolated execution environment that allows testing of access to resources by the application when executed in the test zone.

7. The apparatus of claim 6, wherein the instructions further cause the processor to be configured to monitor which mock resources are accessed by the application when executed in the test zone.

8. The apparatus of claim 1, wherein the instructions further cause the processor to be configured to:

allow a user to move the application from the test zone to the standard zone; and provide the application to access the genuine resources when executed in the standard zone.

9. The apparatus of claim 1, wherein the instructions further cause the processor to be configured to automatically present to a user which mock resources have been accessed by the application in the test zone when the application is moved from the test zone to the standard zone.

10. The apparatus of claim 1, wherein the instructions further cause the processor to be configured to provide a user with a choice which genuine resources corresponding to the accessed mock resources the application will be allowed to be accessed by the application when the application is executed in the standard zone.

11. The apparatus of claim 1, wherein the instructions further cause the processor to be configured to request a user to decide whether the application should be installed in the test zone.

12. The apparatus of claim 1, wherein the mock resources comprise a mock user data backend, and wherein the genuine resources comprise a genuine user data backend.

13. The apparatus of claim 12, wherein the mock user data backend contains correctly formatted but fake user data, and wherein the genuine user data backend contains correctly formatted and genuine user data.

14. The apparatus of claim 1, wherein the test zone isolates the application from an operating system of the apparatus and other applications on the apparatus.

15. A method for testing an application on an apparatus for executing the application, comprising:

receiving a user selection of whether to execute the application in a standard zone or a test zone;

executing the application in the test zone that does not allow access to genuine resources on the apparatus in response to the user selection indicating the test zone;

allowing the application to access mock resources in the test zone, wherein a mock resource models a genuine resource of the apparatus;

displaying the application and other applications as application icons on an application icon grid of a user interface of the apparatus, wherein at least one of the application icons is displayed with a first graphical indicator indicating that the application corresponding to the at least one of the application icons is executed in the test zone;

launching the application associated with the at least one of the application icons in the test zone; and displaying the application launched in the test zone along with a second graphical indicator indicating that the application is executed in the test zone.

16. The method of claim 15, further comprising preventing the application executed in the test zone from accessing the genuine resources on the apparatus.

17. The method of claim 15, further comprising monitoring which mock resources are accessed by the application when executed in the test zone.

18. The method of claim 17, further comprising presenting to a user a list of mock resources that have been accessed by the application when executed in the test zone.

19. A computer program product comprising a non-transitory computer readable storage medium storing a program code thereon for testing an application on an apparatus for executing the application, wherein the program code comprises instructions for executing a method that comprises:

receiving a user selection of whether to execute the application in a standard zone or a test zone;

executing the application in the test zone that does not allow access to genuine resources on the apparatus in response to the user selection indicating the test zone;

allowing the application to access mock resources in the test zone, wherein the mock resources model genuine resources of the apparatus;

displaying the application and other applications as application icons on an application icon grid of a user interface of the apparatus, wherein at least one of the application icons is displayed with a first graphical indicator indicating that the application corresponding to the at least one of the application icons is executed in the test zone;

launching the application associated with the at least one of the application icons in the test zone; and displaying the application launched in the test zone along with a second graphical indicator indicating that the application is executed in the test zone.

20. The apparatus of claim 1, wherein the instructions further cause the processor to be configured to request a user to decide whether the application should be installed in the standard zone.

* * * * *